United States Patent
Kobayashi et al.

(10) Patent No.: US 8,284,348 B2
(45) Date of Patent: Oct. 9, 2012

(54) BACKLIGHT APPARATUS AND LIQUID CRYSTAL DISPLAY APPARATUS

(75) Inventors: Takahiro Kobayashi, Okayama (JP); Yuichi Nishikoji, Kyoto (JP)

(73) Assignee: Panasonic Corporation, Osaka (JP)

( * ) Notice: Subject to any disclaimer, the term of this patent is extended or adjusted under 35 U.S.C. 154(b) by 317 days.

(21) Appl. No.: 12/465,301

(22) Filed: May 13, 2009

(65) Prior Publication Data
US 2010/0020268 A1 Jan. 28, 2010

(30) Foreign Application Priority Data
Jul. 28, 2008 (JP) ................. 2008-194049

(51) Int. Cl.
G02F 1/1335 (2006.01)
G09G 3/36 (2006.01)
(52) U.S. Cl. .............. 349/65; 345/102; 345/690
(58) Field of Classification Search .......... None
See application file for complete search history.

(56) References Cited

U.S. PATENT DOCUMENTS

| | | | |
|---|---|---|---|
| 2002/0140880 A1* | 10/2002 | Weindorf et al. | 349/70 |
| 2007/0195025 A1* | 8/2007 | Korcharz et al. | 345/82 |
| 2007/0285378 A1* | 12/2007 | Lankhorst et al. | 345/102 |
| 2007/0291198 A1* | 12/2007 | Shen | 349/69 |
| 2009/0153464 A1* | 6/2009 | Furukawa et al. | 345/102 |
| 2009/0251922 A1* | 10/2009 | Ueyama | 362/613 |
| 2011/0109655 A1* | 5/2011 | Takeda | 345/690 |
| 2011/0292090 A1* | 12/2011 | Otani | 345/690 |

FOREIGN PATENT DOCUMENTS

| | | |
|---|---|---|
| JP | 2007-165632 | 6/2007 |
| WO | WO 2007138724 A1 * | 12/2007 |

* cited by examiner

*Primary Examiner* — Hemang Sanghavi
(74) *Attorney, Agent, or Firm* — Hamre, Schumann, Mueller & Larson, P.C.

(57) ABSTRACT

A backlight apparatus is provided that enables a balance of brightness to be maintained and long life to be achieved over the entire area of a display screen. Light guide plate 130 has upper end surface 132a and lower end surface 132b as inputting surfaces, and principal surface 131 as an outputting surface opposite the rear surface of liquid crystal panel 110. LEDs 140a and 140b are placed in proximity to upper end surface 132a and lower end surface 132b. LED drive circuits 160 supply LEDs 140a and 140b with a current that causes LEDs 140a and 140b to emit light that illuminates liquid crystal panel 110 via light guide plate 130. LED drive circuits 160 supply a lower current to LEDs 140a and 140b placed in proximity to a part having a higher ambient temperature within upper end surface 132a and lower end surface 132b.

10 Claims, 8 Drawing Sheets

BACKLIGHT APPARATUS AND LIQUID CRYSTAL DISPLAY APPARATUS

CROSS REFERENCE TO RELATED APPLICATIONS

The disclosure of Japanese Patent Application No. 2008-194049 filed on Jul. 28, 2008 including the specification, drawings and abstract is incorporated herein by reference in its entirety.

BACKGROUND

1. Technical Field

The technical field relates to a backlight apparatus and liquid crystal display apparatus, and more particularly to an LED (light emitting diode) backlight apparatus in which a plurality of LEDs are arrayed and a liquid crystal display having this.

2. Description of the Related Art

There is one kind of liquid crystal display apparatus that illuminates a liquid crystal panel using an LED backlight apparatus (hereinafter referred to simply as "LED backlight").

Unexamined Japanese Patent Publication No. 2007-165632 describes an example of a conventional liquid crystal display apparatus that has an LED backlight. In this liquid crystal display apparatus, control is performed to increase the brightness of some of the LEDs provided in the backlight—for example LEDs placed in an area in which the ambient temperature is high, such as those close to a circuit with a large calorific value—by increasing the amount of drive current or the period for which that current is applied. Backlight brightness is made uniform by means of this control.

However, a property of an LED is that the higher its ambient temperature, the faster is the aging degradation of its brightness and the shorter is its life. Also, increasing the brightness of an LED by increasing its drive current amount or the like is a cause of aging degradation of LED brightness and shortened LED life.

Therefore, when control is performed to increase the drive current amount for LEDs placed in an area in which the ambient temperature is high, as in the case of an above-described conventional liquid crystal display apparatus, the aging degradation of those LEDs is more rapid than that of other LEDs. Consequently, as the cumulative illumination time of those LEDs increases, the brightness of those LEDs becomes lower than that of other LEDs. Therefore, uniformity of backlight brightness cannot be maintained over a long period. In other words, even if uniformity of brightness is maintained in the initial state, that balance is lost after a long period of use.

Also, even if the amount of drive current or the like is increased for LEDs whose brightness decreases to prevent a decrease in the brightness of those LEDs, there is a limit to the increase in the drive current amount, and a situation will eventually arise in which uniformity of brightness cannot be maintained.

SUMMARY

An object is to provide a backlight apparatus and a liquid crystal display apparatus that enables a balance of brightness to be maintained over the entire area of a display screen and long life to be achieved.

A backlight apparatus achieves the above object by comprising a light guide plate having an inputting surface and an outputting surface that is opposite the rear surface of a liquid crystal panel, a plurality of light emitting diodes placed in proximity to the inputting surface, and a current supplying section that supplies to the plurality of light emitting diodes a current that causes the plurality of light emitting diodes to emit light that illuminates the liquid crystal panel via the light guide plate; and by having the current supplying section supply a lower current to a light emitting diode placed in proximity to a part having a higher ambient temperature within the inputting surface.

A backlight apparatus that is used in a liquid crystal display apparatus having a liquid crystal panel and a liquid crystal driver driving the liquid crystal panel, achieves the above object by comprising a light guide plate having an inputting surface and an outputting surface that is opposite the rear surface of the liquid crystal panel, a plurality of light emitting diodes placed facing the inputting surface, and a current supplying section that supplies to the plurality of light emitting diodes a current that causes the plurality of light emitting diodes to emit light that illuminates the liquid crystal panel via the light guide plate; and by having the current supplying section supply a lower current to a light emitting diode placed nearer the liquid crystal driver.

BRIEF DESCRIPTION OF THE DRAWINGS

The above and other objects and features of the invention will appear more fully hereinafter from a consideration of the following description taken in conjunction with the accompanying drawings wherein examples are illustrated by way of example, in which.

DETAILED DESCRIPTION OF THE PREFERRED EMBODIMENTS

With reference now to the accompanying drawings, embodiments of the present invention will be explained in detail below.

(Embodiment 1)

Figure 1:
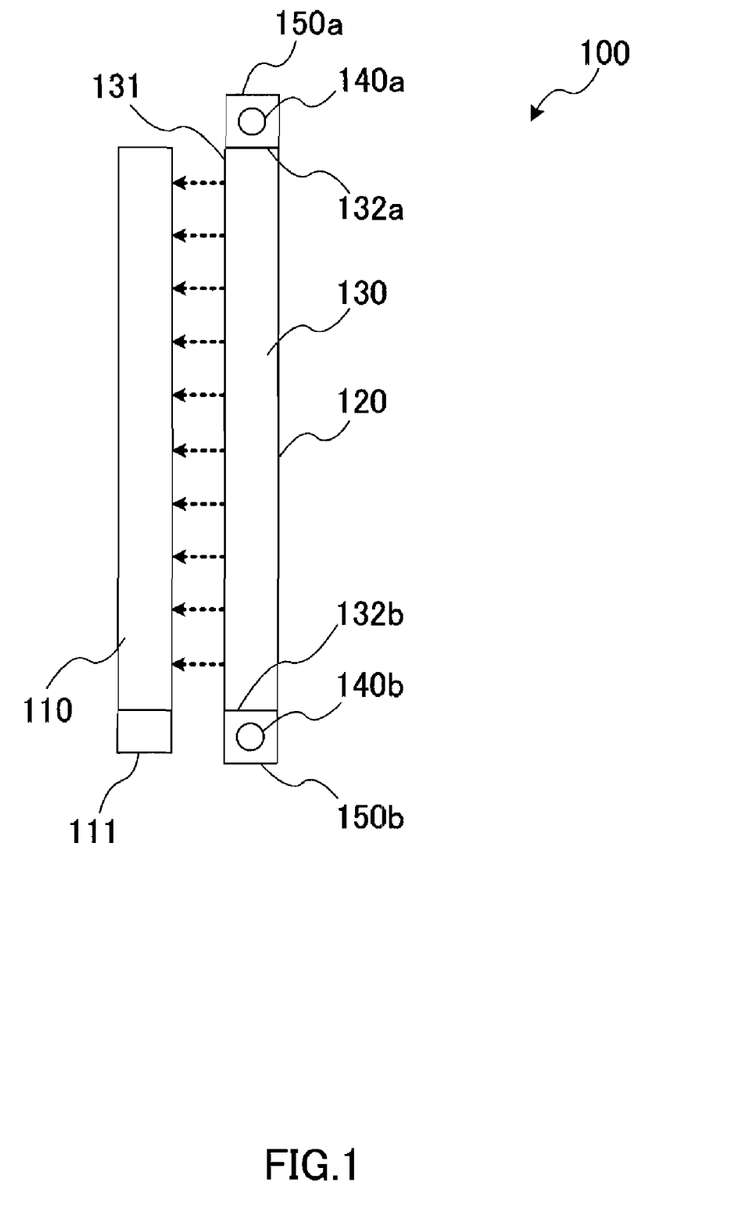
FIG. 1 is a side view of the principal parts of a liquid crystal display apparatus according to Embodiment 1 of the present invention.

FIG. 1 is a side view of the principal parts of a liquid crystal display apparatus according to Embodiment 1 of the present invention.

Liquid crystal display apparatus 100 has liquid crystal panel 110, liquid crystal driver 111, and LED backlight 120 as main components.

Liquid crystal panel 110 is a transmissive or semi-transmissive liquid crystal panel. Liquid crystal panel 110 transmits light emitted from LED backlight 120, and emits this transmitted light from the front surface of the display screen.

Liquid crystal driver 111 is placed in proximity to the lower edge of liquid crystal panel 110. In the descriptions of all the embodiments, "lower" means lower in the vertical direction of the display screen (hereinafter referred to simply as "vertical direction") and in FIG. 1 corresponds to the bottom of the drawing in the vertical direction.

Liquid crystal driver 111 controls a drive voltage that drives liquid crystal panel 110 based on a video signal that is a digital signal indicating video to be displayed on the display screen of liquid crystal panel 110, and thereby controls the transmittance of liquid crystal panel 110. As a result of this control, liquid crystal panel 110 displays video.

Liquid crystal driver 111 may be placed in a position other than the above. For example, liquid crystal driver 111 may be placed in proximity to the upper edge, left-hand edge, or right-hand edge of liquid crystal panel 110, or elsewhere. In the descriptions of all the embodiments, "upper" means upper in the vertical direction, and "left" and "right" mean left and right in the horizontal direction of the display screen (hereinafter referred to simply as "horizontal direction").

LED backlight 120 has light guide plate 130 placed in such a way that principal surface 131 serving as an outputting surface is opposite the rear surface side of liquid crystal panel 110. Also, in proximity to upper end surface 132a serving as an inputting surface of light guide plate 130, LEDs 140a are arrayed facing upper end surface 132a, and in proximity to lower end surface 132b, LEDs 140b are arrayed facing lower end surface 132b. That is to say, LED backlight 120 is an edge-light type of backlight apparatus.

LEDs 140a and 140b are placed in frames 150a and 150b, and frames 150a and 150b are provided as an adjunct to and are integral with light guide plate 130, but the structure of LED backlight 120 is not limited to this.

LED backlight 120 illuminates liquid crystal panel 110 with light emitted from LEDs 140a and 140b. In the following description, LEDs 140a and 140b are referred to simply as "LED(s) 140" when described without any particular differentiation.

LED backlight 120 has an LED drive section that drives LEDs 140, described later herein.

Here, LEDs 140 are white LEDs that emit white light when driven by a drive signal applied from a LED drive section described later herein. For example, when LEDs 140 are LED apparatuses having mainly a monochromatic (for example, blue) LED and a fluorescent material, LEDs 140 are configured so that light emitted from a monochromatic LED when a drive signal is applied is transmitted through the fluorescent material and becomes white light through the action of the fluorescent material.

LEDs 140 may also employ another configuration, such as a combination of LEDs of three colors—R (red) G (green), and B (blue).

The width of the angle of divergence of each LED 140 is set in accordance with the interval between adjacent LEDs 140 so that LED backlight 120 uniformly illuminates the entire area of the display screen.

Figure 2:
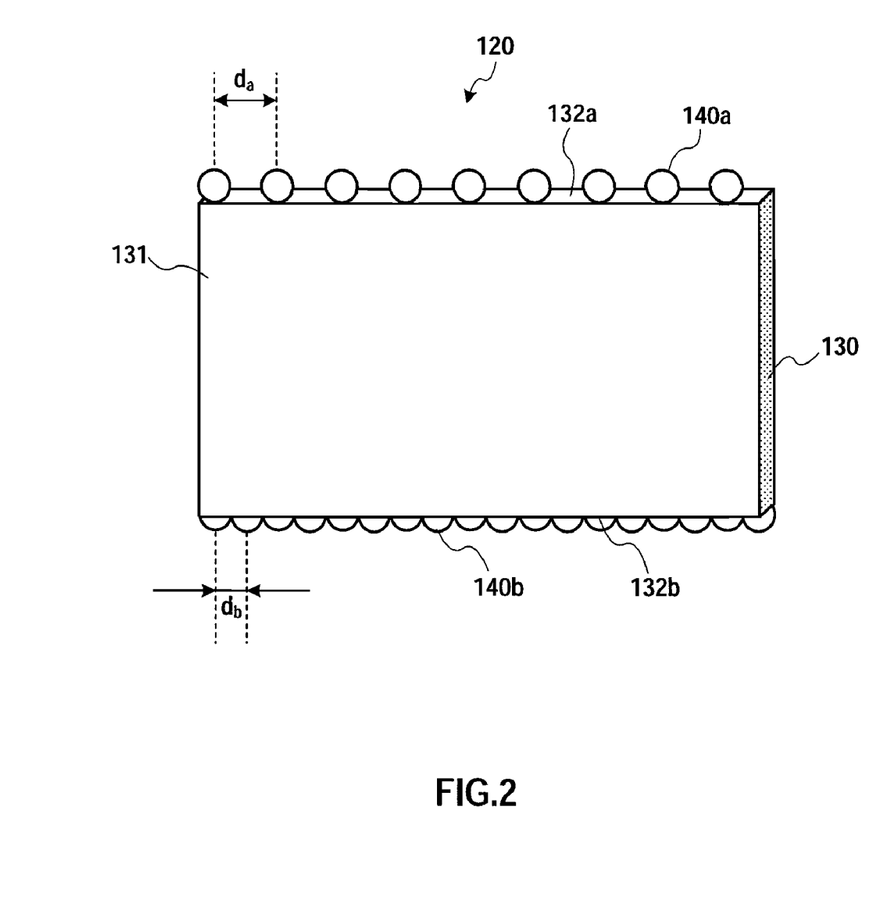
FIG. 2 is a drawing showing an LED array of an LED backlight according to Embodiment 1 of the present invention.

FIG. 2 is a drawing showing the placement of LEDs 140 in LED backlight 120.

LEDs 140 are placed so as to form arrays on upper end surface 132a and lower end surface 132b respectively of LED backlight 120. Specifically, on the upper end surface 132a side, LEDs 140a are arrayed linearly and at equal intervals (pitch $d_a$) along the direction of extension of upper end surface 132a (the same as the horizontal direction), and LEDs 140b are arrayed linearly and at equal intervals (pitch $d_b$) along the direction of extension of lower end surface 132b (the same as the horizontal direction). Pitch $d_b$ is smaller than pitch $d_a$.

Figure 3A:
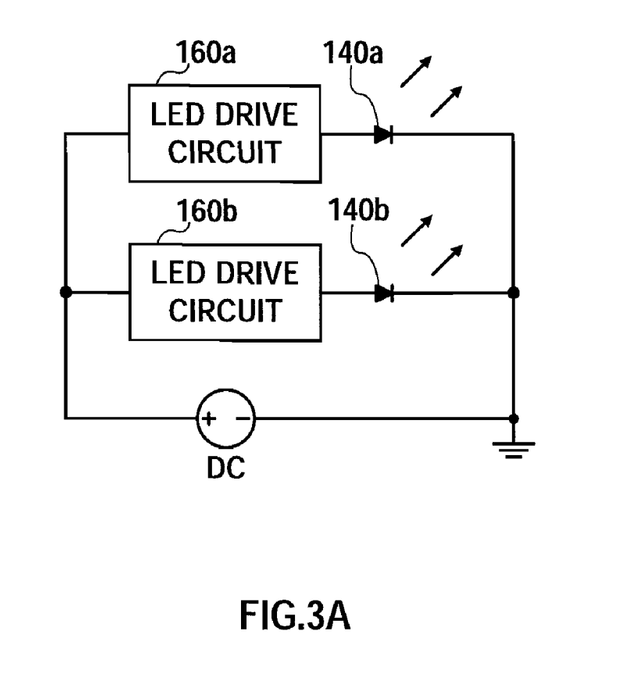
FIG. 3A is a circuit diagram showing the configuration of an LED drive section according to Embodiment 1 of the present invention.
Figure 3B:
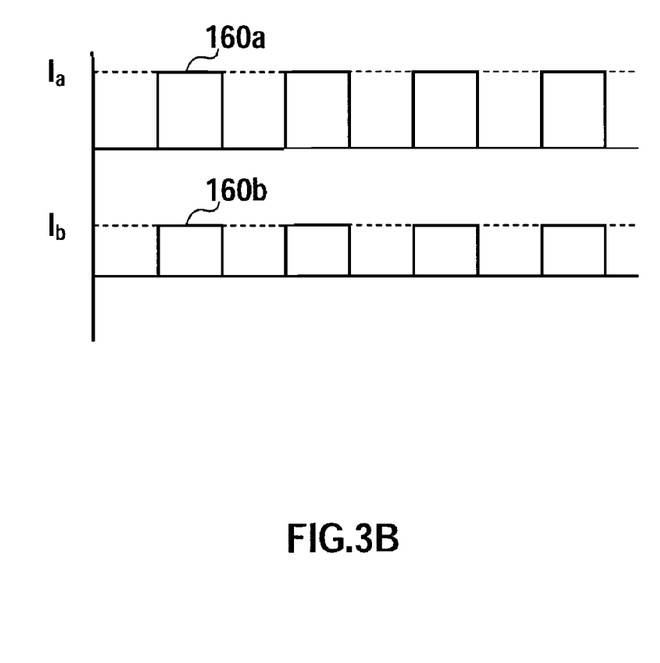
FIG. 3B is a waveform diagram showing drive signals according to Embodiment 1 of the present invention.

FIG. 3 is a drawing for explaining an LED drive section in LED backlight 120. FIG. 3A is a circuit diagram showing an example of the configuration of the LED drive section, and FIG. 3B is a waveform diagram showing an example of drive signals generated by the LED drive section and supplied to LEDs 140.

The LED drive section has LED drive circuits 160a and 160b. In the following description, LED drive circuits 160a and 160b are referred to simply as "LED drive circuit(s) 160" when described without any particular differentiation.

LED drive circuit 160a supplies drive signal 161a having preset current value $I_a$ to one LED 140a as a current supplying section, and LED drive circuit 160b supplies drive signal 161b having current value $I_b$ to one LED 140b as a current supplying section.

Although not shown in FIG. 3A, the LED drive section has the same number of LED drive circuits 160 (as current supplying sections) as LEDs 140. Each LED drive circuit 160 supplies a drive signal to one LED 140. By means of this configuration, each LED 140a is supplied with drive signal 161a having current value $I_a$, and each LED 140b is supplied with drive signal 161b having current value $I_b$.

Current value $I_b$ is smaller than current value $I_a$, and drive signals 161a and 161b have the same duty cycle.

That is to say, a lower current is supplied to LEDs 140b placed lower down and located nearer liquid crystal driver 111.

The current value of each LED 140 is set optimally based on the temperature distribution in upper end surface 132a and lower end surface 132b of LED backlight 120. For example, upper end surface 132a located comparatively far from liquid crystal driver 111 is shown as a low-temperature area in the temperature distribution since the influence of heat generation from liquid crystal driver 111 is comparatively small. Therefore, an LED 140a current value is set comparatively high. Also, lower end surface 132b located comparatively near liquid crystal driver 111 is shown as a high-temperature area in the temperature distribution since the influence of heat generation from liquid crystal driver 111 is comparatively large. Therefore, an LED 140b current value is set comparatively low. These settings are made in such a way that the junction temperature becomes equal in LEDs 140a and 140b.

By this means, LEDs 140b placed lower down and located nearer liquid crystal driver 111 emit light at lower brightness. When this kind of drive control is performed, a difference in brightness may occur between LEDs 140a and 140b. However, since the junction temperatures of LEDs 140a and 140b are equal, no difference in aging degradation progress occurs between LEDs 140a and 140b. Therefore, even if there is a difference in brightness between LEDs 140a and 140b, such a balance of brightness is maintained unchanged over a long period.

Also, LEDs 140b placed lower down, located nearer liquid crystal driver 111, and supplied with a lower current, are placed with higher density adjacent to another LED 140b forming the same array. For example, the number and placement positions of LEDs 140a and 140b are set in such a way that luminous flux of all LEDs 140a and luminous flux of all LEDs 140b are equal.

By this means, uniformity of brightness is realized over the entire area of the display screen, and is maintained unchanged over a long period.

It is possible to obtain the same kind of effect by making current values I the same and making the duty cycle of drive signal 161b smaller than that of drive signal 161a.

Figure 4:
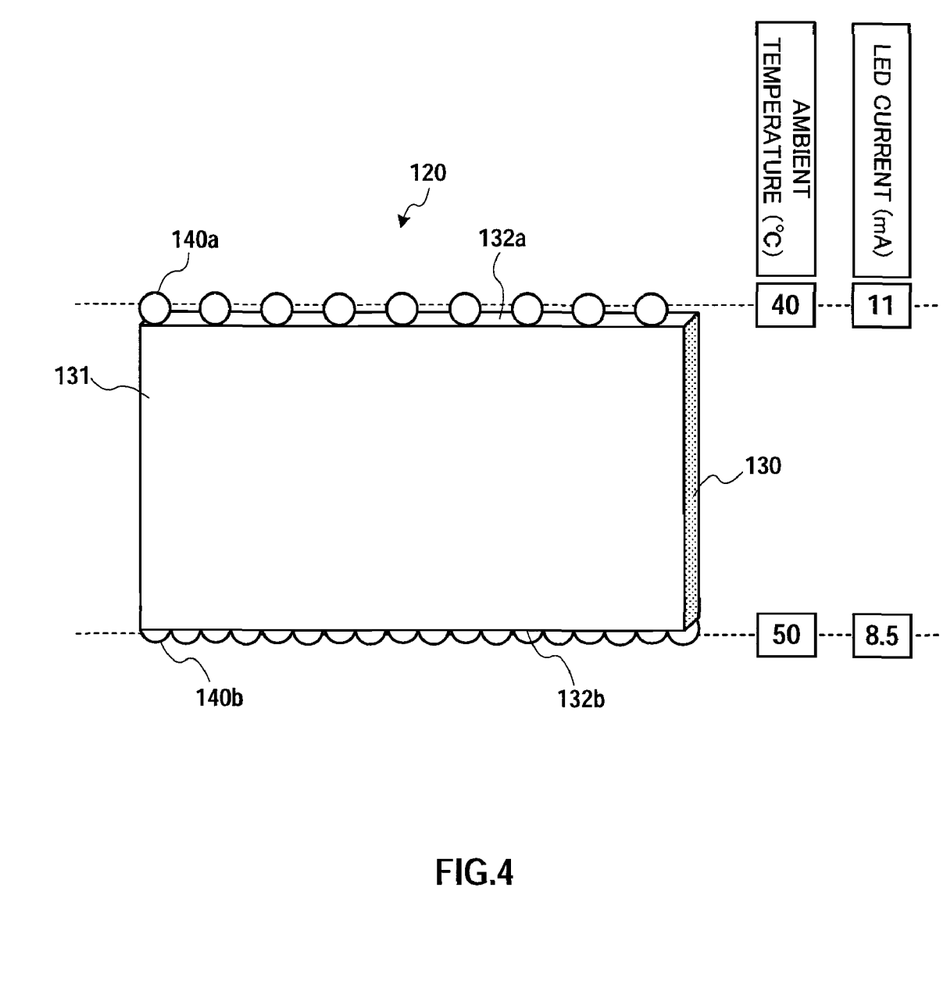
FIG. 4 is a drawing showing a brightness correction method according to Embodiment 1 of the present invention.

Next, the brightness correction method used in liquid crystal display apparatus 100 will be described.

FIG. 4 is a drawing for explaining the brightness correction method used in liquid crystal display apparatus 100. Here, a case is described by way of example in which the ambient temperature of lower end surface 132b located lower down becomes higher during LED 140 illumination.

LEDs 140b are placed with higher density than LEDs 140a. Simply by employing this kind of LED placement, a difference in a decrease in the brightness of LEDs 140a and 140b due to a difference in ambient temperature can be corrected, and brightness can be made uniform over the entire area of the display screen. This is possible even if drive signals with the same current value are supplied to all of LEDs 140a and 140b.

However, in this embodiment, LED placement is decided in such a way that supposing that drive signals with the same current value are supplied to all of LEDs 140a and 140b, brightness is higher in an area lower down in the display screen. Thus, when this kind of LED placement is employed, LEDs 140b are supplied with a lower current than LEDs 140a. By this means, brightness in the LED 140a illumination area (that is, the area of the display screen illuminated by light emitted from all LEDs 140a) and brightness in the LED 140b illumination area become uniform.

Figure 5A:
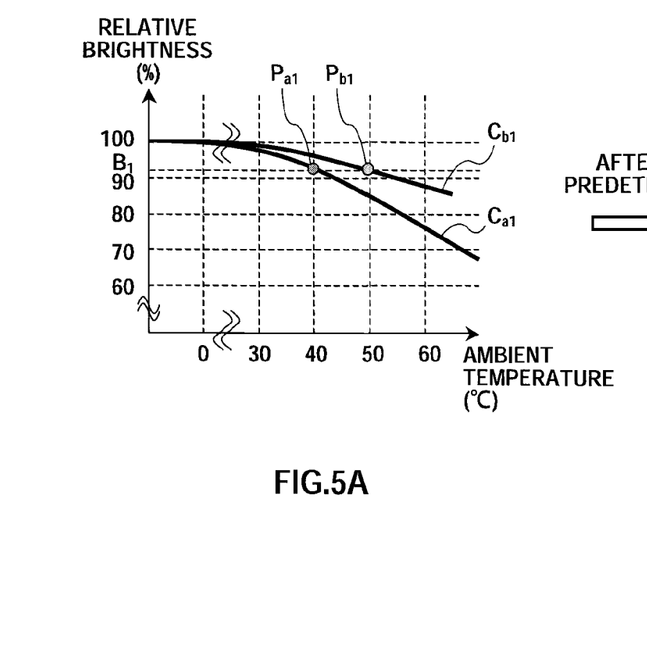
FIG. 5A is a drawing showing the relationship between ambient temperature and relative brightness for an initial-state LED backlight according to Embodiment 1 of the present invention.
Figure 5B:
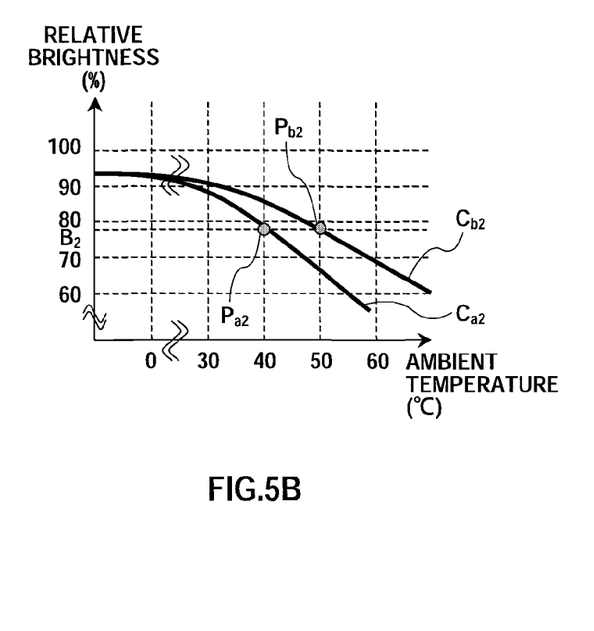
FIG. 5B is a drawing showing the relationship between ambient temperature and relative brightness for an LED backlight after a predetermined elapse of time according to Embodiment 1 of the present invention.

The effect of the brightness correction method shown in FIG. 4 will now be described in greater detail with reference to FIG. 5A and FIG. 5B. FIG. 5A shows an example of the relationship between ambient temperature and relative brightness for initial-state LED backlight 120, and FIG. 5B shows an example of the relationship between ambient temperature and relative brightness for LED backlight 120 after use for a predetermined time (for example, 10,000 hours).

The ambient temperature of LEDs 140b placed near liquid crystal driver 111, which generates heat during operation, rises compared with that of LEDs 140a placed far from liquid crystal driver 111. Therefore, the brightness of LEDs 140b themselves is lower than that of LEDs 140a.

Furthermore, LEDs 140b are supplied with a lower current than LEDs 140b (in the example shown in FIG. 4, 8.5 mA for LEDs 140b compared with 11 mA for LEDs 140a). This is a further cause of the brightness of LEDs 140b themselves becoming lower than that of LEDs 140a.

However, while LEDs 140b are placed with comparatively high density, LEDs 140a are placed with comparatively low density.

Consequently, in the initial state, characteristics are obtained whereby brightness in the LED 140b illumination area falls relatively gently (curve $C_{b1}$) as the ambient temperature of LEDs 140b rises, and brightness in the LED 140a illumination area falls relatively markedly (curve $C_{a1}$) as the ambient temperature of LEDs 140a rises.

In this case, when LED backlight 120 is turned on, the ambient temperature of LEDs 140b becomes 50° C., and relative brightness in the LED 140b illumination area becomes $B_1$% (point $P_{b1}$). Meanwhile, the ambient temperature of LEDs 140a becomes 40° C., and relative brightness in the LED 140a illumination area becomes $B_1$% (point $P_{a1}$). Thus, brightness is uniform over the entire area of the display screen.

When the cumulative usage time of LED backlight 120 reaches a predetermined time, characteristics are obtained whereby brightness in the LED 140b illumination area falls relatively gently (curve $C_{b2}$) as the ambient temperature of LEDs 140b rises, and brightness in the LED 140a illumination area falls relatively markedly (curve $C_{a2}$) as the ambient temperature of LEDs 140a rises. Here, comparing curve $C_{a1}$ and curve $C_{b1}$ in FIG. 5A with curve $C_{a2}$ and curve $C_{b2}$ in FIG. 5B, it can be seen that aging degradation has occurred in brightness for both LEDs 140a and LEDs 140b.

In this case, when LED backlight 120 is turned on, the ambient temperature of LEDs 140b becomes 50° C., and relative brightness in the LED 140b placement area becomes $B_2$% (point $P_{b2}$). Meanwhile, the ambient temperature of LEDs 140a becomes 40° C., and relative brightness in the LED 140a placement area becomes $B_2$% (point $P_{a2}$). That is to say, although aging degradation of brightness has occurred in both areas, since the degree of progress is the same for both, uniformity of brightness is maintained over the entire area of the display screen. This is because the progress of aging degradation of LEDs 140b is slowed by supplying a relatively low current to LEDs 140b, whose aging degradation should be relatively rapid due to the fact that the ambient temperature is relatively high.

As described above, according to this embodiment, a lower current is supplied to LEDs 140b placed in proximity to a part with a higher ambient temperature within an inputting surface of LED backlight 120. By this means, the progress of aging degradation of all of LEDs 140a and 140b provided in LED backlight 120 is made uniform. Therefore, the balance of brightness over the entire area of the display screen can be maintained over a long period. Also, according to this embodiment, control to slow aging degradation (that is, supply of a relatively low current) is performed for LEDs 140b, for which aging degradation should be relatively rapid due to a relatively high ambient temperature. Therefore, the life of LED backlight 120 can be prolonged.

In this embodiment, a case has been described by way of example in which the ambient temperature of an area lower down is higher, and a configuration has been described in which LEDs 140b placed in an area lower down are placed with higher density, and are driven by a lower current. However, other configurations are also possible.

For example, if liquid crystal driver 111 is placed in proximity to the upper edge of liquid crystal panel 110, so that the ambient temperature of an upper area becomes higher than that of an area below, a configuration can be employed in which LEDs 140a placed in an upper area are placed with higher density, and are driven by a lower current.

Also, if liquid crystal driver 111 is placed in proximity to the left-hand edge of liquid crystal panel 110, so that the ambient temperature of an area to the left becomes higher than that of an area to the right, a configuration can be employed in which LEDs 140 placed in an area to the left are placed with higher density, and are driven by a lower current.

Also, if liquid crystal driver 111 is placed in proximity to the right-hand edge of liquid crystal panel 110, so that the ambient temperature of an area to the right becomes higher than that of an area to the left, a configuration can be employed in which LEDs 140 placed in an area to the right are placed with higher density, and are driven by a lower current.

Essentially, when the ambient temperature of an area near liquid crystal driver 111 becomes higher than the ambient temperature of an area farther away, a configuration can be employed in which LEDs 140 placed in the former area are placed with higher density, and are driven by a lower current.

Exactly the same applies to a power supply section—that is, power supply circuitry supplying power to liquid crystal driver 111, LED drive circuits 150, and so forth—and to other heat-generating members, as to liquid crystal driver 111. This is because a power supply section and the like also generate heat. Thus, the placement and drive current values of LEDs 140 can be decided according to the placement positions of a power supply section and so forth.

Even if there is temperature distribution such that the ambient temperature of an area lower down does not become higher due to the internal structure of liquid crystal display apparatus 100, the placement and drive current values of LEDs 140 can still be decided based on that temperature distribution.

In this embodiment, LEDs 140 are white LEDs, but the same kind of effect as described above can also be realized if LEDs 140 are a combination of LEDs of three colors—R (red), G (green), and B (blue). In this case, a configuration is employed in which more red LEDs, which decrease greatly in brightness due to temperature, are placed in a high-temperature area than green or blue LEDs. By this means, the color temperature balance can also be maintained over a long period.

(Embodiment 2)

Figure 6:
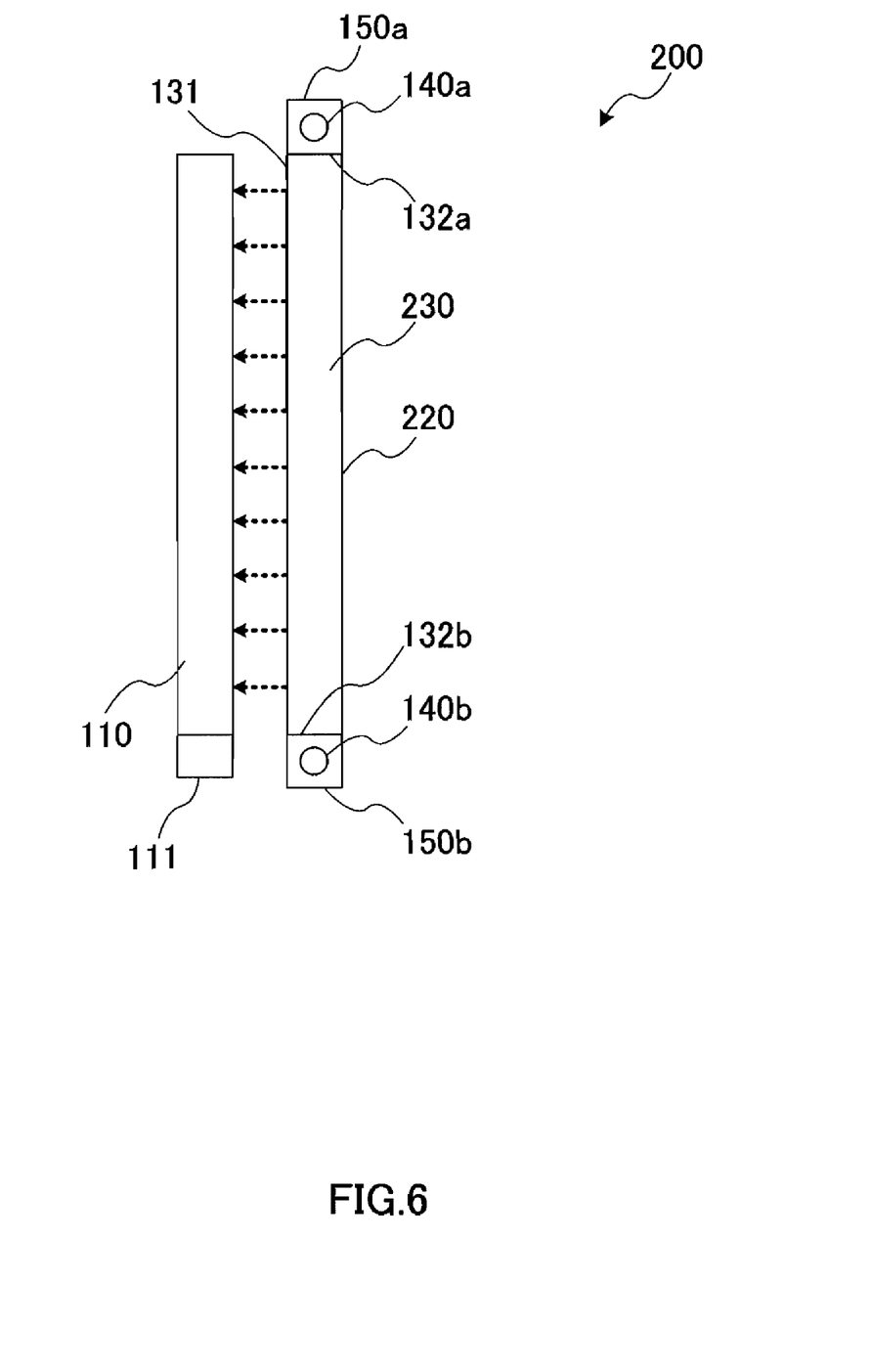
FIG. 6 is a side view of the principal parts of a liquid crystal display apparatus according to Embodiment 2 of the present invention.

FIG. 6 is a side view of the principal parts of a liquid crystal display apparatus according to Embodiment 2 of the present invention. Configuration elements identical to those in Embodiment 1 are assigned the same reference codes as in Embodiment 1, and detailed descriptions thereof are omitted here.

This embodiment differs from Embodiment 1 in that there is no difference in LED placement density.

Liquid crystal display apparatus 200 has liquid crystal panel 110, liquid crystal driver 111, and LED backlight 220 as main components.

LED backlight 220 has light guide plate 230 placed in such a way that principal surface 131 serving as an outputting surface is opposite the rear surface side of liquid crystal panel 110. Also, in proximity to upper end surface 132a serving as an inputting surface of light guide plate 230, LEDs 140a are arrayed facing upper end surface 132a, and in proximity to lower end surface 132b, LEDs 140b are arrayed facing lower end surface 132b. That is to say, LED backlight 220 is an edge-light type of backlight apparatus.

LED backlight 220 illuminates liquid crystal panel 110 with light emitted from LEDs 140.

LED backlight 220 also has an LED drive section that drives LEDs 140. The LED drive section is identical to that described with reference to FIG. 3A and FIG. 3B in Embodiment 1.

Here, light guide plate 230 has a diffusion pattern such that even if there is a difference between luminous flux of light from all LEDs 140a input upon upper end surface 132a and luminous flux of light from all LEDs 140b input upon lower end surface 132b, brightness becomes uniform over the entire area of the display screen. For example, there is a method whereby a dot pattern is formed by means of silk-screen printing, and uniformity is maintained by controlling the density and size of that dot pattern. There is also a method whereby parallel V-shaped grooves are formed in the display screen, and uniformity is maintained by means of the pitch and depth of those grooves. By such means, uniformity of brightness is maintained over a long period.

Figure 7:
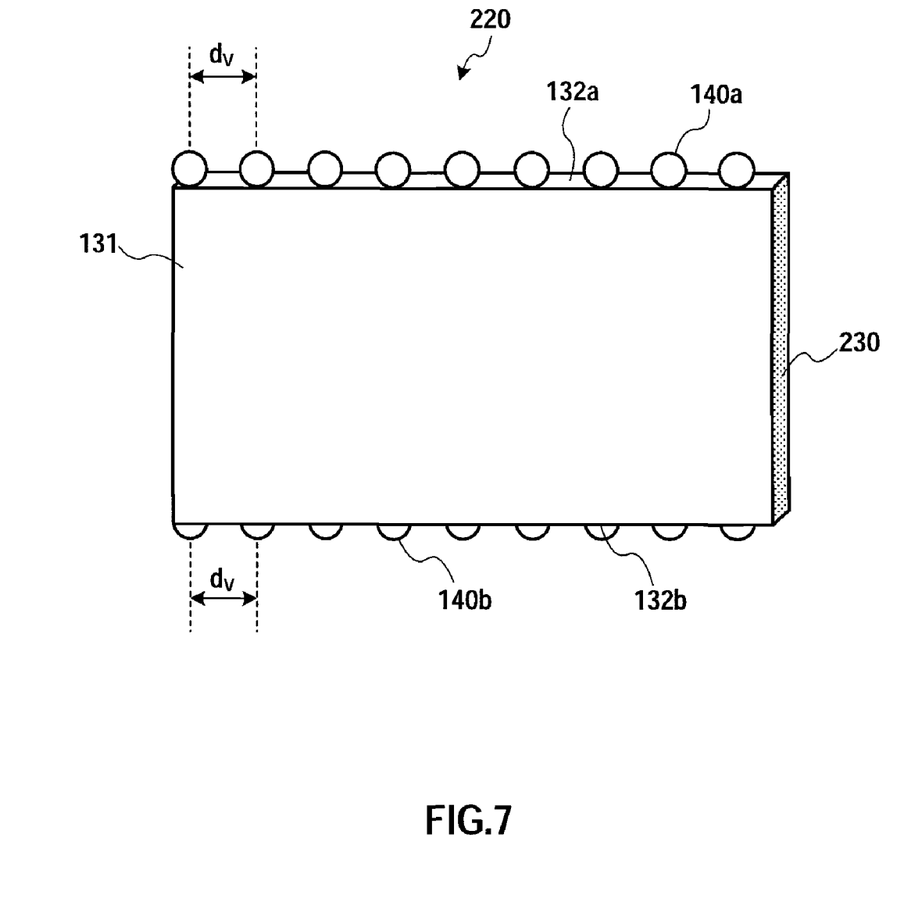
FIG. 7 is a drawing showing an LED array of an LED backlight according to Embodiment 2 of the present invention.

FIG. 7 is a drawing showing the placement of LEDs 140 in LED backlight 220.

LEDs 140 are placed so as to form arrays on upper end surface 132a and lower end surface 132b respectively of LED backlight 220. Specifically, on the upper end surface 132a side, LEDs 140a are arrayed linearly and at equal intervals (pitch $d_v$) along the direction of extension of upper end surface 132a (the same as the horizontal direction), and on the lower end surface 132b side, LEDs 140b are arrayed linearly and at equal intervals (pitch $d_v$) along the direction of extension of lower end surface 132b (the same as the horizontal direction). Pitch $d_v$ between LEDs 140a and pitch $d_v$ between LEDs 140b are the same.

According to the above-described configuration, a lower current is supplied to LEDs 140b placed lower down and located nearer liquid crystal driver 111.

The current value of each LED 140 is set optimally based on the temperature distribution in upper end surface 132a and lower end surface 132b of LED backlight 220. For example, upper end surface 132a located comparatively far from liquid crystal driver 111 is shown as a low-temperature area in the temperature distribution since the influence of heat generation from liquid crystal driver 111 is comparatively small. Therefore, an LED 140a current value is set comparatively high. Also, lower end surface 132b located comparatively near liquid crystal driver 111 is shown as a high-temperature area in the temperature distribution since the influence of heat generation from liquid crystal driver 111 is comparatively large. Therefore, an LED 140b current value is set comparatively low. These settings are made in such a way that the junction temperature becomes equal in LEDs 140a and 140b.

By this means, LEDs 140b placed lower down and located nearer liquid crystal driver 111 emit light at lower brightness. When this kind of drive control is performed, a difference in brightness may occur between LEDs 140a and 140b. However, since the junction temperatures of LEDs 140a and 140b are equal, no difference in aging degradation progress occurs between LEDs 140a and 140b. Therefore, even if there is a difference in brightness between LEDs 140a and 140b, such a balance of brightness is maintained unchanged over a long period.

Also, according to the above-described configuration, light guide plate 230 has a diffusion pattern such that brightness becomes uniform over the entire area of the display screen.

By this means, uniformity of brightness is realized over the entire area of the display screen, and is maintained unchanged over a long period.

As described above, according to this embodiment, a lower current is supplied to LEDs 140b placed in proximity to a part with a higher ambient temperature within an inputting surface of LED backlight 220. By this means, the progress of aging degradation of all of LEDs 140a and 140b provided in LED backlight 220 is made uniform. Therefore, the balance of brightness over the entire area of the display screen can be maintained over a long period. Also, according to this embodiment, control to slow aging degradation (that is, supply of a relatively low current) is performed for LEDs 140b, for which aging degradation should be relatively rapid due to a relatively high ambient temperature. Therefore, the life of LED backlight 220 can be prolonged.

In this embodiment, a case has been described by way of example in which the ambient temperature of an area lower down is higher, and a configuration has been described in which LEDs 140a and 140b are placed with the same density and LEDs 140b are driven by a lower current. However, other configurations are also possible.

For example, if liquid crystal driver 111 is placed in proximity to the upper edge of liquid crystal panel 110, so that the ambient temperature of an upper area becomes higher than that of an area below, a configuration can be employed in which LEDs 140a and 140b are placed with the same density and LEDs 140a are driven by a lower current.

Also, if liquid crystal driver 111 is placed in proximity to the left-hand edge of liquid crystal panel 110, so that the ambient temperature of an area to the left becomes higher than that of an area to the right, a configuration can be employed in which LEDs 140a and 140b are placed with the same density and LEDs 140 placed in an area to the left are driven by a lower current.

Also, if liquid crystal driver 111 is placed in proximity to the right-hand edge of liquid crystal panel 110, so that the ambient temperature of an area to the right becomes higher than that of an area to the left, a configuration can be employed in which LEDs 140a and 140b are placed with the same density and LEDs 140 placed in an area to the right are driven by a lower current.

Essentially, when the ambient temperature of an area near liquid crystal driver 111 becomes higher than the ambient temperature of an area farther away, a configuration can be employed in which LEDs 140 placed in an area near liquid crystal driver 111 are driven by a lower current, while uniformity of the placement density of LEDs 140a and 140b is maintained.

Exactly the same applies to a power supply section—is, power supply circuitry supplying power to liquid crystal driver 111, LED drive circuits 160, and so forth—and to other heat-generating members, as to liquid crystal driver 111. This is because a power supply section and the like also generate heat. Thus, the placement and drive current values of LEDs 140 can be decided according to the placement positions of a power supply section and so forth.

Even if there is temperature distribution such that the ambient temperature of an area lower down does not become higher due to the internal structure of liquid crystal display apparatus 200, the placement and drive current values of LEDs 140 can still be decided based on that temperature distribution.

In this embodiment, LEDs 140 are white LEDs, but the same kind of effect as described above can also be realized if LEDs 140 are a combination of LEDs of three colors—R (red), G (green), and B (blue). In this case, a configuration is employed in which more red LEDs, which decrease greatly in brightness due to temperature, are placed in a high-temperature area than green or blue LEDs. By this means, the color temperature balance can also be maintained over a long period.

(Embodiment 3)

Embodiment 3 of the present invention will now be described. A liquid crystal display apparatus according to this embodiment has the same kind of basic configuration as liquid crystal display apparatus 100 described in Embodiment 1. Therefore, when referring to a configuration element of the same kind as in Embodiment 1, that configuration element is assigned the same reference code as in Embodiment 1, and a detailed description thereof is omitted.

This embodiment differs from the above-described embodiments in that an LED 140 current value is adjusted according to an input video signal.

A liquid crystal display apparatus according to this embodiment has an estimation section (not shown) that estimates a calorific value of liquid crystal driver 111 or a temperature rise due to that calorific value from a video signal input to liquid crystal driver 111. LED drive circuits 160 adjust current values $I_a$ and $I_b$ of drive signals 161a and 161b supplied to LEDs 140 in accordance with an estimation result from the estimation section.

Figure 8A:
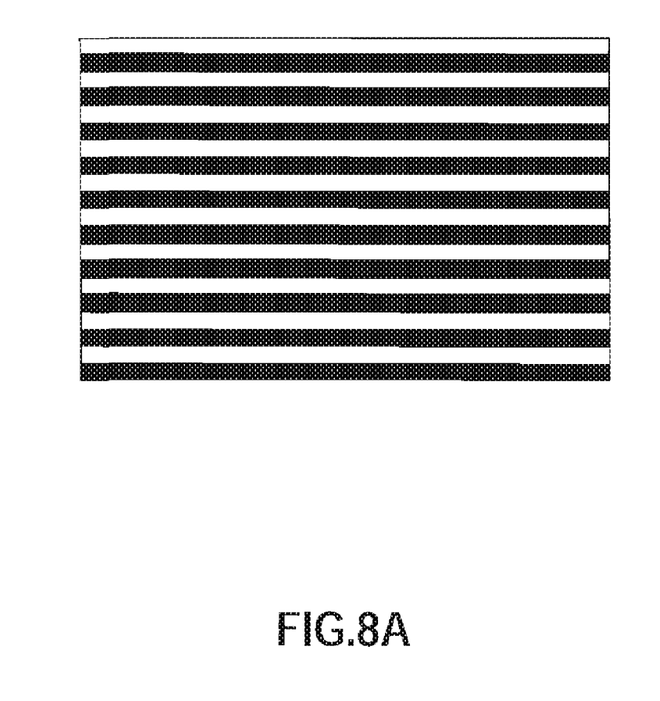
FIG. 8A is a drawing showing an example of video display.

For example, when a video signal such that video having major brightness variation in the vertical direction is displayed, as shown in FIG. 8A, is input to liquid crystal driver 111, the calorific value of liquid crystal driver 111 is large, and a temperature rise due to this is also large. Consequently, the ambient temperature of LEDs 140b located nearer liquid crystal driver 111 rises still further. As a result, brightness degradation over time of LEDs 140b accelerates. Therefore, when this kind of signal is input, acceleration of brightness degradation is suppressed by lowering current value $I_b$ of LEDs 140b near liquid crystal driver 111. At this time, current value $I_a$ of LEDs 140a located farther from liquid crystal driver 111 is also lowered. By this means, uniformity of brightness of the entire display screen can be maintained.

Figure 8B:
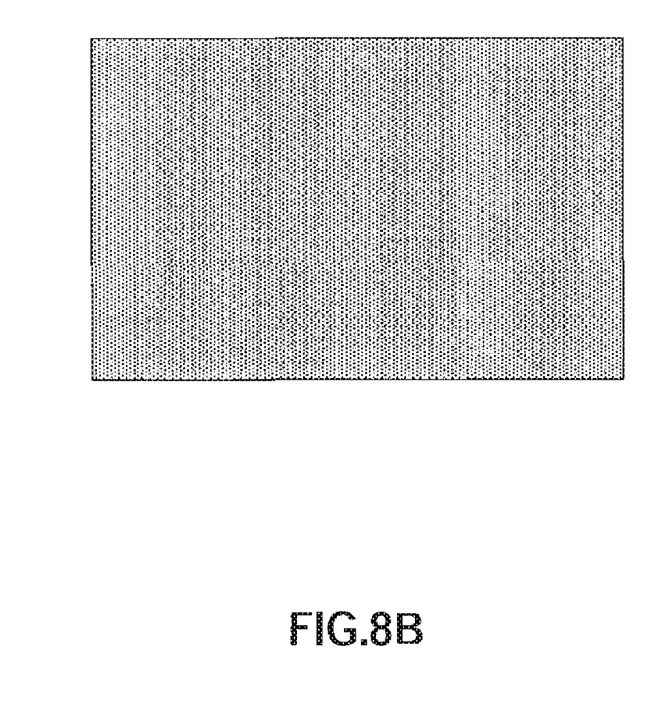
FIG. 8B is a drawing showing another example of video display.

Also, when a video signal such that video having little brightness variation in the vertical direction is displayed, as shown in FIG. 8B, is input to liquid crystal driver 111, the calorific value of liquid crystal driver 111 is small, and a temperature rise due to this is also small. Consequently, the ambient temperature of LEDs 140b located nearer liquid crystal driver 111 is not greatly influenced. Therefore, when this kind of signal is input it is not necessary to lower current values $I_a$ and $I_b$ of LEDs 140a and 140b, unlike the case illustrated in FIG. 8A. Rather, the brightness of the entire display screen may be increased by raising current values $I_a$ and $I_b$.

The relationship between an input video signal and the power consumption of liquid crystal driver 111 cannot be determined uniquely by the drive. For example, in the case of a video signal resulting in vertical-direction change points becoming large and numerous in normal column reversal, the power consumption of liquid crystal driver 111 increases. Furthermore, the power consumption of liquid crystal driver 111 also increases in the case of a video signal with no vertical-direction change points in zigzag column reversal.

The configuration of this embodiment can also be applied to liquid crystal display apparatus 200 of Embodiment 2.

(Embodiment 4)

Embodiment 4 of the present invention will now be described. A liquid crystal display apparatus according to this embodiment has the same kind of basic configuration as liquid crystal display apparatus 100 described in Embodiment 1. Therefore, when referring to a configuration element of the same kind as in Embodiment 1, that configuration element is assigned the same reference code as in Embodiment 1, and a detailed description thereof is omitted.

This embodiment differs from the above-described embodiments in that an LED current value is adjusted according to a liquid crystal driver 111 temperature detection result.

A liquid crystal display apparatus according to this embodiment has a temperature sensor that measures the temperature of liquid crystal driver 111 as a detecting section. LED drive circuits 160 adjust current values $I_a$ and $I_b$ of drive signals 161a and 161b supplied to LEDs 140 in accordance with a temperature measurement result.

For example, when a measured temperature is high, the ambient temperature of LEDs 140b located nearer liquid crystal driver 111 rises still further. As a result, brightness degradation over time of LEDs 140b accelerates. Therefore, acceleration of brightness degradation is suppressed by lowering current value $I_b$ of LEDs 140b near liquid crystal driver 111. At this time, current value $I_a$ of LEDs 140a located farther from liquid crystal driver 111 is also lowered. By this means, uniformity of brightness of the entire display screen can be maintained.

Also, when a measured temperature is low, the ambient temperature of LEDs 140b located nearer liquid crystal driver 111 is not greatly influenced. Therefore, it is not necessary to lower current values $I_a$ and $I_b$ of LEDs 140a and 140b. Rather, the brightness of the entire display screen may be increased by raising current values $I_a$ and $I_b$.

The configuration of this embodiment can also be applied to liquid crystal display apparatus 200 of Embodiment 2 and the liquid crystal display apparatus of Embodiment 3.

This concludes a description of embodiments of the present invention.

The above descriptions are illustrations of preferred embodiments of the present invention, and the scope of the present invention is not limited to these. That is to say, the configurations and operations during use of the above-described apparatuses are simply examples, and it is clearly possible to make various modifications and additions to these examples without departing from the scope of the present invention.

What is claimed is:

1. A backlight apparatus comprising:
a light guide plate having an inputting surface and an outputting surface that is opposite a rear surface of a liquid crystal panel;
a plurality of light emitting diodes placed in proximity to the inputting surface; and
a current supplying section that supplies to the plurality of light emitting diodes a current that causes the plurality of light emitting diodes to emit light that illuminates the liquid crystal panel via the light guide plate,
wherein the current supplying section supplies a lower current to a light emitting diode placed in proximity to a part having a higher ambient temperature within the inputting surface and the supplied current is adjusted according to a video input signal.

2. The backlight apparatus according to claim 1, wherein:
the inputting surface includes a pair of end surfaces; and
the current supplying section supplies a lower current to a light emitting diode placed in proximity to a surface having a higher ambient temperature of the pair of end surfaces.

3. A backlight apparatus that is used in a liquid crystal display apparatus having a liquid crystal panel and a liquid crystal driver driving the liquid crystal panel, the backlight apparatus comprising:
a light guide plate having an inputting surface and an outputting surface that is opposite a rear surface of the liquid crystal panel;
a plurality of light emitting diodes placed facing the inputting surface; and
a current supplying section that supplies to the plurality of light emitting diodes a current that causes the plurality of light emitting diodes to emit light that illuminates the liquid crystal panel via the light guide plate,
wherein the current supplying section supplies a lower current to a light emitting diode placed nearer the liquid crystal driver and the supplied current is adjusted according to a video input signal.

4. The backlight apparatus according to claim 3, wherein:
the inputting surface includes a pair of end surfaces; and
the current supplying section supplies a lower current to a light emitting diode placed in proximity to a surface nearer the liquid crystal driver of the pair of end surfaces.

5. The backlight apparatus according to claim 4, wherein:
the liquid crystal panel has a display screen;
the liquid crystal driver is placed in proximity to a lower edge of the liquid crystal panel in a vertical direction of the display screen;
the pair of end surfaces include an upper surface and lower surface in the vertical direction; and
the power supply section supplies a lower current to a light emitting diode placed in proximity to the lower surface than to a light emitting diode placed in proximity to the upper surface.

6. The backlight apparatus according to claim 1, wherein a light emitting diode to which a lower current is supplied is placed with higher density adjacent to another light emitting diode.

7. The backlight apparatus according to claim 1, wherein:
the liquid crystal panel has a display screen; and
the light guide plate has a diffusion pattern that makes brightness uniform over an entire area of the display screen.

8. The backlight apparatus according to claim 1, wherein the current supplying section adjusts a current supplied to all of the plurality of light emitting diodes according to a calorific value of a liquid crystal driver that drives the liquid crystal panel based on the video input signal to the liquid crystal driver.

9. The backlight apparatus according to claim 1, further comprising a detecting section that detects a temperature of a liquid crystal driver that drives the liquid crystal panel,
wherein the current supplying section adjusts a current supplied to all of the plurality of light emitting diodes according to a detected temperature.

10. A liquid crystal display apparatus comprising:
the backlight apparatus according to claim 1; and
a liquid crystal panel that transmits light emitted from the backlight and emits the transmitted light from a front surface of the liquid crystal panel.

* * * * *